(12) United States Patent
Obana et al.

(10) Patent No.: US 10,319,199 B2
(45) Date of Patent: Jun. 11, 2019

(54) VIBRATION GENERATION SYSTEM, VIBRATION GENERATION APPARATUS, STORAGE MEDIUM HAVING STORED THEREIN VIBRATION SIGNAL GENERATION PROGRAM, AND VIBRATION GENERATION METHOD

(71) Applicant: NINTENDO CO., LTD., Kyoto (JP)

(72) Inventors: Kazutoshi Obana, Kyoto (JP); Kochi Kawai, Kyoto (JP); Junichiro Miyatake, Nagaokakyo (JP); Masahiko Inami, Yokohama (JP); Kouta Minamizawa, Yokohama (JP)

(73) Assignee: Nintendo Co., Ltd., Kyoto (JP)

( * ) Notice: Subject to any disclaimer, the term of this patent is extended or adjusted under 35 U.S.C. 154(b) by 133 days.

(21) Appl. No.: 14/691,809

(22) Filed: Apr. 21, 2015

(65) Prior Publication Data

US 2016/0012687 A1  Jan. 14, 2016

(30) Foreign Application Priority Data

Jul. 9, 2014 (JP) .................................. 2014-141295

(51) Int. Cl.
| | | |
|---|---|---|
| *G08B 6/00* | (2006.01) | |
| *H04R 3/04* | (2006.01) | |
| *A63F 13/54* | (2014.01) | |
| *A63F 13/285* | (2014.01) | |

(52) U.S. Cl.
CPC .............. *G08B 6/00* (2013.01); *A63F 13/285* (2014.09); *A63F 13/54* (2014.09); *A63F 2300/1037* (2013.01); *H04R 3/04* (2013.01); *H04R 2400/03* (2013.01); *H04R 2499/11* (2013.01)

(58) Field of Classification Search
None
See application file for complete search history.

(56) References Cited

U.S. PATENT DOCUMENTS

| | | | | |
|---|---|---|---|---|
| 6,586,861 B2* | 7/2003 | Misu | ........................ | H03H 3/04 |
| | | | | 310/324 |
| 6,896,785 B2* | 5/2005 | Shatrov | .................... | C25D 5/18 |
| | | | | 204/164 |

(Continued)

FOREIGN PATENT DOCUMENTS

| | | |
|---|---|---|
| EP | 2 249 587 | 11/2010 |
| JP | 2002-359888 | 12/2002 |

(Continued)

OTHER PUBLICATIONS

European Search Report dated Dec. 2, 2015 issued in corresponding EP Application No. 15163947.3 (10 pages).

*Primary Examiner* — Steven Lim
*Assistant Examiner* — Muhammad Adnan
(74) *Attorney, Agent, or Firm* — Nixon & Vanderhye PC

(57) ABSTRACT

Sound pressure information indicated by a sound signal and belonging to a frequency range above an upper limit that enables at least a user to perceive a vibration is converted into sound pressure information belonging to a frequency range less than or equal to the upper limit or belonging to a low-frequency range, and a vibration signal is generated using the sound pressure information after the conversion. This makes it possible to generate a vibration signal.

18 Claims, 11 Drawing Sheets

(56) References Cited

U.S. PATENT DOCUMENTS

| | | | | |
|---|---|---|---|---|
| 7,107,096 B2* | 9/2006 | Fischell | ............... | A61B 5/0452 |
| | | | | 600/508 |
| 7,198,605 B2* | 4/2007 | Donofrio | ............. | A61B 5/1106 |
| | | | | 600/544 |
| 8,167,826 B2* | 5/2012 | Oohashi | ............... | A61M 21/02 |
| | | | | 601/2 |
| 9,083,821 B2* | 7/2015 | Hughes | ............... | H04M 19/047 |
| 9,247,342 B2* | 1/2016 | Croft, III | ............. | H04R 1/2811 |
| 2002/0149561 A1* | 10/2002 | Fukumoto | .......... | G01C 21/3664 |
| | | | | 345/156 |
| 2006/0188115 A1 | 8/2006 | Lenhardt | | |
| 2009/0128306 A1* | 5/2009 | Luden | .................... | G06F 3/016 |
| | | | | 340/407.1 |
| 2009/0189748 A1* | 7/2009 | Bergere | ............... | H04R 1/1091 |
| | | | | 340/407.1 |
| 2010/0038998 A1* | 2/2010 | Onishi | ................... | H04R 17/00 |
| | | | | 310/334 |
| 2010/0148942 A1* | 6/2010 | Oh | .......................... | G10L 21/06 |
| | | | | 340/407.1 |
| 2010/0284557 A1* | 11/2010 | Fitz | ..................... | H04R 25/353 |
| | | | | 381/317 |
| 2011/0128132 A1* | 6/2011 | Ullrich | ...................... | G06F 3/16 |
| | | | | 340/407.1 |
| 2012/0306631 A1* | 12/2012 | Hughes | ................ | G09B 21/009 |
| | | | | 340/407.1 |
| 2013/0265286 A1* | 10/2013 | Da Costa | ................ | G06F 3/016 |
| | | | | 345/177 |
| 2015/0070269 A1* | 3/2015 | Bhatia | ..................... | G06F 3/016 |
| | | | | 345/156 |
| 2015/0216762 A1* | 8/2015 | Oohashi | ................ | A61M 21/02 |
| | | | | 601/47 |
| 2015/0251089 A1* | 9/2015 | Komori | .................. | A63F 13/28 |
| | | | | 463/35 |
| 2015/0268723 A1* | 9/2015 | Saboune | ................ | G06F 3/016 |
| | | | | 345/156 |
| 2018/0005497 A1* | 1/2018 | Venkatesan | ......... | H04L 25/4902 |

FOREIGN PATENT DOCUMENTS

| | | |
|---|---|---|
| JP | 2003-275464 | 9/2003 |
| WO | WO 95/25414 | 9/1995 |
| WO | WO 99/14986 | 3/1999 |
| WO | WO2011/043292 | 4/2011 |

* cited by examiner

F I G. 3
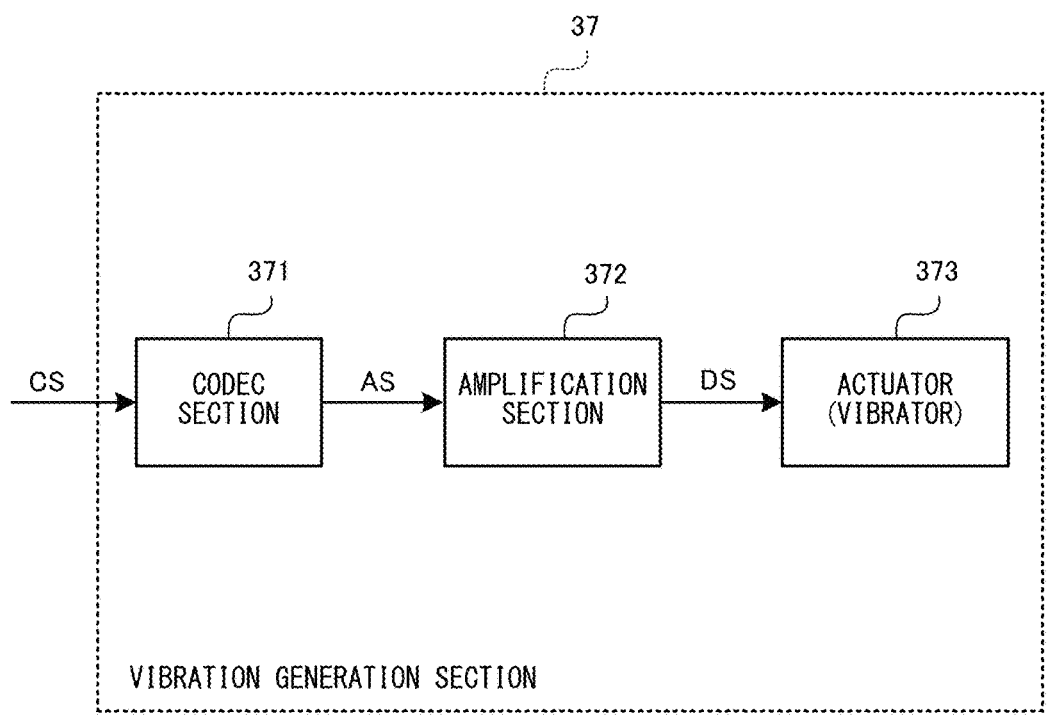

FIG. 4
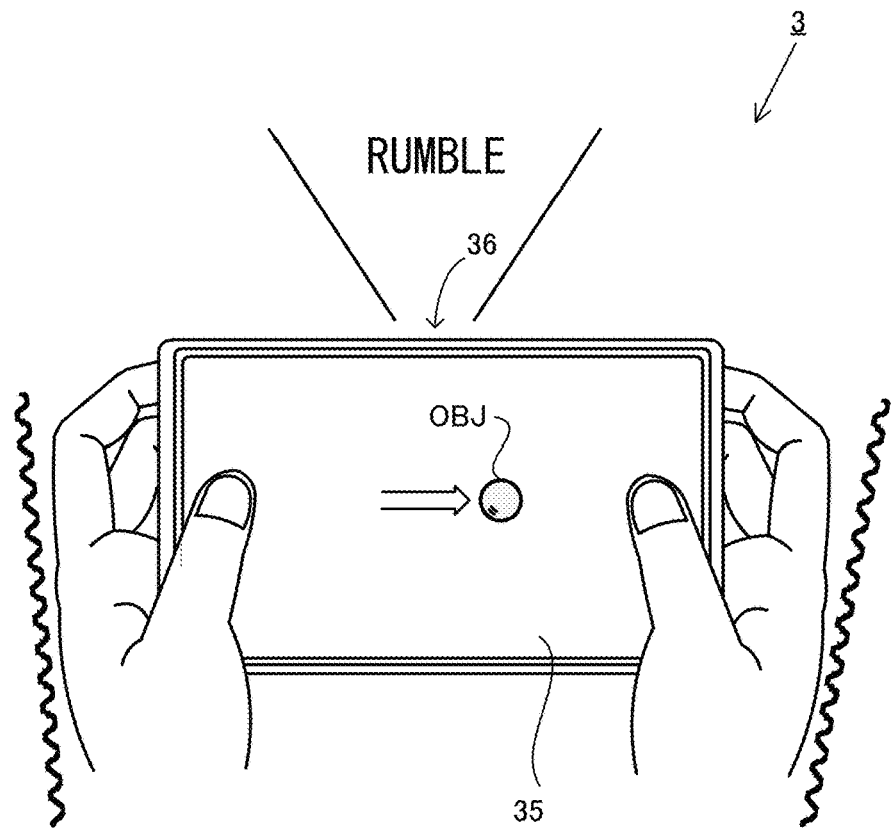
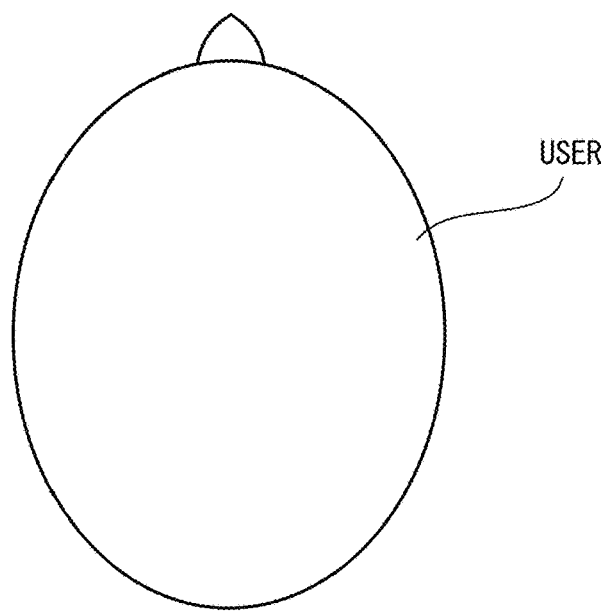

F I G. 1 5
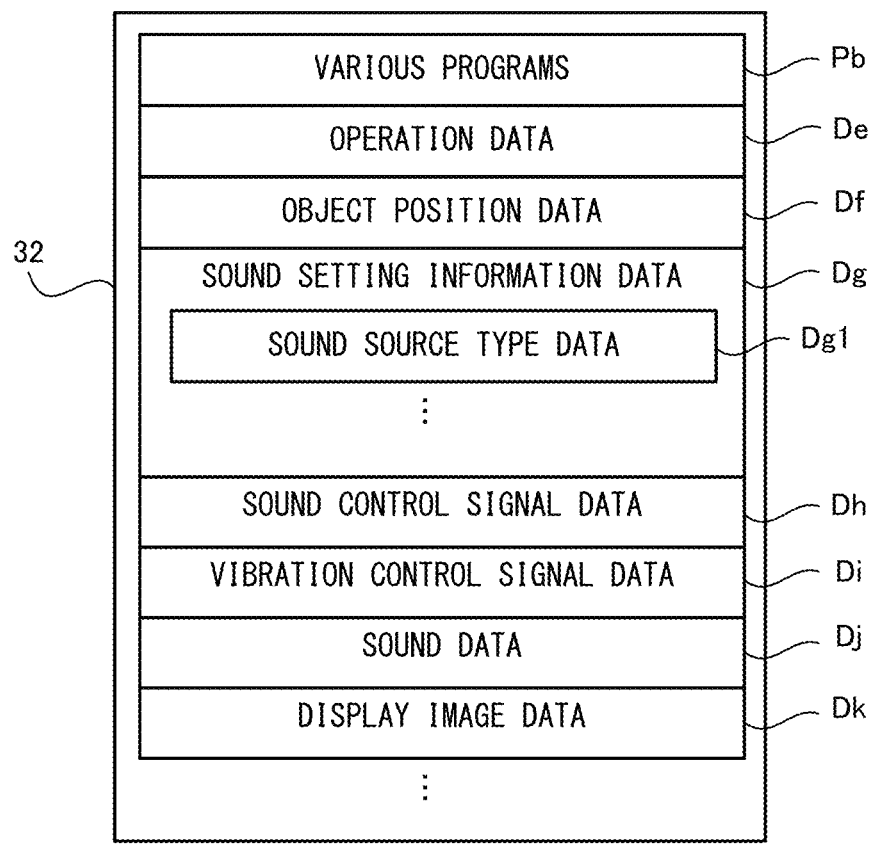

VIBRATION GENERATION SYSTEM, VIBRATION GENERATION APPARATUS, STORAGE MEDIUM HAVING STORED THEREIN VIBRATION SIGNAL GENERATION PROGRAM, AND VIBRATION GENERATION METHOD

CROSS REFERENCE TO RELATED APPLICATION

The disclosure of Japanese Patent Application No. 2014-141295, filed on Jul. 9, 2014, is incorporated herein by reference.

FIELD

The technology shown here relates to a vibration generation system, a vibration generation apparatus, a storage medium having stored therein a vibration signal generation program, and a vibration generation method, and in particular, relates to a vibration generation system, a vibration generation apparatus, and a vibration generation method for, for example, generating a vibration to be imparted to a user, and a storage medium having stored therein a vibration signal generation program for, for example, generating a vibration to be imparted to a user.

BACKGROUND AND SUMMARY

Conventionally, a game apparatus for imparting vibrations to the main body of the apparatus is known. For example, the game apparatus vibrates vibrators provided in the game apparatus, thereby transmitting vibrations to the finger and the hand of a user holding the game apparatus.

The game apparatus, however, merely imparts constant vibrations to the user, using the vibrators.

Therefore, it is an object of an exemplary embodiment to provide a vibration generation system, a vibration generation apparatus, and a vibration generation method that are capable of generating a vibration signal for outputting a vibration rich in variety, and a storage medium having stored therein a vibration signal generation program capable of generating a vibration signal for outputting a vibration rich in variety.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a vibration signal generation system according to an exemplary embodiment, a vibration signal generation system generates a vibration signal from a sound signal. The vibration signal generation system includes one or more processor configured to: as a frequency shift, convert sound pressure information indicated by a sound signal and belonging to a frequency range above an upper limit that enables at least a user to perceive a vibration, into sound pressure information belonging to a frequency range less than or equal to the upper limit; and generate a vibration signal using the sound pressure information after the conversion in the frequency shift.

Based on the above, it is possible to generate a vibration signal using a sound signal. Further, a sound signal in a frequency range above an upper limit that does not enable a user to perceive a vibration is shifted to a frequency range less than or equal to the upper limit. This makes it possible to generate a vibration signal that can be perceived as a vibration.

In addition, in the frequency shift, with the sound pressure information at a predetermined time left, the sound pressure information may be converted into the sound pressure information belonging to the frequency range less than or equal to the upper limit.

Based on the above, using sound pressure information at a predetermined time, it is possible to generate a vibration signal corresponding to the sound pressure.

In addition, in the frequency shift, based on a peak of sound pressure indicated by the sound signal, the sound pressure information belonging to the frequency range above the upper limit may be converted into the sound pressure information belonging to the frequency range less than or equal to the upper limit.

Based on the above, using the peak of sound pressure indicated by the sound signal, it is possible to generate a vibration signal corresponding to the sound.

In addition, in the frequency shift, a section maximum value in each certain section may be extracted from waveform data of the sound signal, and using the section maximum value, the sound pressure information belonging to the frequency range above the upper limit may be converted into the sound pressure information belonging to the frequency range less than or equal to the upper limit.

Based on the above, using a section maximum value, it is possible to easily convert sound pressure information into sound pressure information belonging to the frequency range less than or equal to the upper limit.

In addition, in the frequency shift, a moving maximum value in each certain moving section may be extracted from waveform data of the sound signal, and using the moving maximum value, the sound pressure information belonging to the frequency range above the upper limit may be converted into the sound pressure information belonging to the frequency range less than or equal to the upper limit.

Based on the above, using a moving maximum value, it is possible to easily convert sound pressure information into sound pressure information belonging to the frequency range less than or equal to the upper limit.

In addition, in the frequency shift, a curve passing through a local maximum value of sound pressure in waveform data of the sound signal may be used as the sound pressure information belonging to the frequency range less than or equal to the upper limit.

Based on the above, using a local maximum value of sound pressure, it is possible to easily convert sound pressure information into sound pressure information belonging to the frequency range less than or equal to the upper limit.

In addition, in the frequency shift, a time axis of the sound signal may be expanded, part of the sound signal after the expansion may be cut out, and the cut-out parts may be joined together, thereby converting the sound pressure information belonging to the frequency range above the upper limit into the sound pressure information belonging to the frequency range less than or equal to the upper limit.

Based on the above, the time axis of the sound signal is expanded, whereby it is possible to easily convert sound pressure information into sound pressure information belonging to the frequency range less than or equal to the upper limit.

In addition, the vibration signal generation system may further include a low-pass filter. The low-pass filter, in the sound pressure information after the conversion in the frequency shift, diminishes a component at a frequency higher than a cutoff frequency set to be less than or equal to a frequency corresponding to the upper limit. In this case, in the generation of the vibration signal, the vibration signal may be generated using the sound pressure information obtained by diminishing the component at the frequency higher than the cutoff frequency.

Based on the above, a low-pass filter process is performed, whereby it is possible to remove a high-frequency component remaining after a frequency shift process.

In addition, in the generation of the vibration signal, the vibration signal may be generated by changing an intensity of a sine wave at a particular frequency, using the sound pressure information after the conversion in the frequency shift.

Based on the above, a particular frequency is set to be less than or equal to the upper limit, whereby it is possible to generate a vibration signal that can be perceived as a vibration. Further, it is possible to enable, with excellent energy efficiency, the vibration of a device having a resonance frequency at the particular frequency.

In addition, in the frequency shift, the sound pressure information belonging to the frequency range above the upper limit may be converted into sound pressure information belonging to a frequency range where a sound cannot be listened to by the user. In the generation of the vibration signal, the sound signal before the conversion in the frequency shift may be added to the sound pressure information after the conversion in the frequency shift, thereby generating the vibration signal.

Based on the above, it is possible to generate a vibration for driving a module into which a unit for outputting a vibration and a unit for outputting a sound are combined and integrated.

In addition, the vibration signal generation system may further include at least one vibrator. The one or more processor is further configured to, as vibration control, vibrate the vibrator using the vibration signal generated in the generation of the vibration signal.

Based on the above, it is possible to output a vibration corresponding to a vibration signal generated by a vibration signal generation system, from the vibration signal generation system.

In addition, the vibration signal generation system may further include at least one sound output unit. The one or more processor is further configured to, as sound control, control a sound to be output from the sound output unit. In this case, a vibration to be output from the vibrator may be controlled in the vibration control and a sound to be output from the sound output unit may be controlled in the sound control, so that the vibration to be output from the vibrator and the sound to be output from the sound output unit are related to each other.

Based on the above, it is possible to output a sound corresponding to the sound signal and also output a vibration corresponding to the sound.

In addition, in another configuration of the vibration signal generation system according to the exemplary embodiment, a vibration signal generation system generates a vibration signal from a sound signal. The vibration signal generation system includes one or more processor configured to: as a frequency shift, convert sound pressure information indicated by a sound signal and belonging to a high-frequency range into sound pressure information belonging to a low-frequency range; and generate a vibration signal using the sound pressure information after the conversion in the frequency shift.

Based on the above, it is possible to generate a vibration signal using a sound signal. Further, a sound signal in a high-frequency range where a sound is difficult to perceive as a vibration is shifted to a low-frequency range. This makes it possible to generate a vibration signal that can be perceived as a vibration.

In addition, the exemplary embodiment may be carried out in the form of a vibration signal generation apparatus, a storage medium having stored therein a vibration signal generation program, or a vibration signal generation method.

According to the exemplary embodiment, it is possible to generate a vibration signal using a sound signal. Further, a sound signal in a high-frequency range where a sound is difficult to perceive as a vibration (e.g., a frequency range above an upper limit that enables a user to perceive a vibration) is shifted to a low-frequency range (e.g., a frequency range less than or equal to the upper limit). This makes it possible to generate a vibration signal that can be perceived as a vibration.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 3 is a block diagram showing a non-limiting example of the configuration of a vibration generation section 37;

FIG. 4 is a diagram showing a non-limiting example where the main body of the information processing apparatus 3 vibrates and simultaneously, a sound is output, in accordance with the display position of a virtual object OBJ displayed on a display screen of a display section 35;

FIG. 15 is a diagram showing non-limiting examples of main data and programs stored in the storage section 32 of the information processing apparatus 3 when game processing is performed.

DETAILED DESCRIPTION OF NON-LIMITING EXAMPLE EMBODIMENTS

With reference to the drawings, a vibration signal generation apparatus (a vibration signal generation system) for executing a vibration signal generation program according to an exemplary embodiment is described. While the vibration signal generation program according to the exemplary embodiment can be applied by being executed by any computer system, a mobile information processing apparatus 3 (a tablet terminal) is used as an example of the vibration signal generation apparatus (the vibration signal generation system), and the vibration signal generation program according to the exemplary embodiment is described using a vibration signal generation program executed by the information processing apparatus 3. For example, the information processing apparatus 3 can execute a program and a pre-installed program (e.g., a game program) stored in a storage medium such as an exchangeable optical disk or an exchangeable memory card, or received from another apparatus. As an example, the information processing apparatus 3 can display on a screen an image generated by a computer graphics process, such as a virtual space image viewed from a virtual camera set in a virtual space. The information processing apparatus 3 may be a device such as a general personal computer, a stationary game apparatus, a mobile phone, a mobile game apparatus, or a PDA (Personal Digital Assistant). It should be noted that FIG. 1 is a plan view of an example of the external appearance of the information processing apparatus 3.

Figure 1:
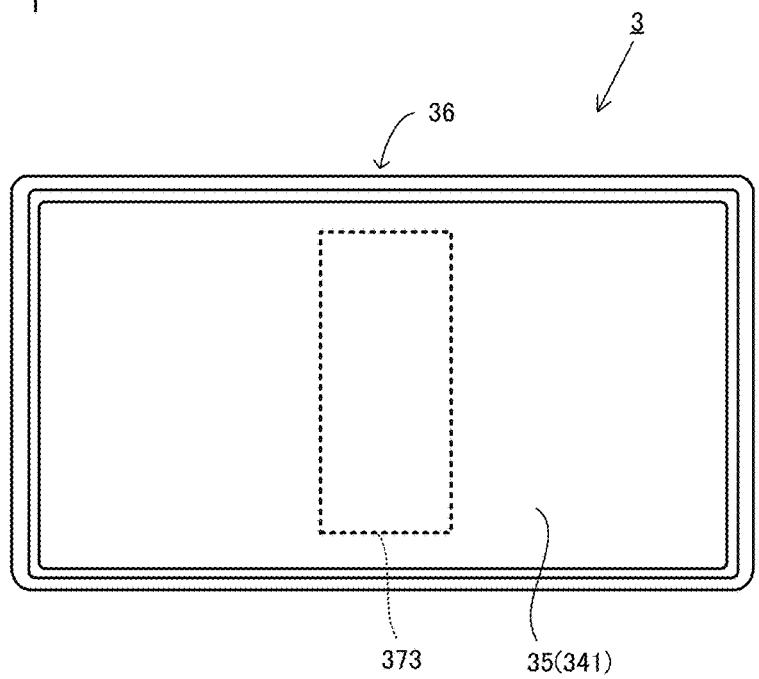
FIG. 1 is a plan view of a non-limiting example of the external appearance of an information processing apparatus 3 according to an exemplary embodiment.

In FIG. 1, the information processing apparatus 3 includes a display section 35, a sound output section 36, and an actuator 373. As an example, the display section 35 is provided on the front surface of the main body of the information processing apparatus 3. For example, the display section 35 includes an LCD (Liquid Crystal Display) and may employ, for example, a display device using EL. Further, the display section 35 may be a display device capable of displaying a stereoscopically viewable image.

A touch panel 341, which is an example of an input section 34, is provided so as to cover a display screen of the display section 35. The touch panel 341 detects the position of an input provided to a predetermined input surface (e.g., the display screen of the display section 35). It should be noted that the input section 34 is an input device that allows a user of the information processing apparatus 3 to input an operation, and the input section 34 may be any input device. For example, as the input section 34, an operation section such as a slide pad, an analog stick, a directional pad, an operation button, or the like may be provided on the side surfaces, the back surface, or the like of the main body of the information processing apparatus 3. Further, the input section 34 may be a sensor for detecting the orientation and the motion of the main body of the information processing apparatus 3. For example, the input section 34 may be an acceleration sensor for detecting the acceleration generated in the main body of the information processing apparatus 3, an angular velocity sensor (a gyro sensor) for detecting the amount of rotation of the main body of the information processing apparatus 3, or the like.

The sound output section 36 includes a loudspeaker for outputting a sound, and in the example shown in FIG. 1, includes a loudspeaker provided on the upper side surface or the back surface of the information processing apparatus 3. The sound output section 36 performs D/A conversion on a sound signal (a sound control signal) output from a control section 31 described later, thereby generating an analog sound signal. Then, the sound output section 36 outputs the analog sound signal to the loudspeaker, thereby outputting a sound.

The actuator 373 is a vibration actuator (a vibrator) for imparting a predetermined vibration to the main body of the information processing apparatus 3 and is included in a vibration generation section 37 described later. In the example shown in FIG. 1, the actuator 373 is provided near the center of the inside of the main body of the information processing apparatus 3. Specifically, as indicated by a dashed line area in FIG. 1, the actuator 373 is provided in a central portion of the display section 35, which is a position between the left hand and the right hand of the user when holding a left end portion of the information processing apparatus 3 in the left hand and holding a right end portion of the information processing apparatus 3 in the right hand. Further, the vibration generation section 37 performs D/A conversion on a vibration control signal output from the control section 31 described later, thereby generating an analog vibration signal. Then, the vibration generation section 37 outputs a driving signal obtained by amplifying the analog vibration signal to the actuator 373, thereby driving the actuator 373.

It should be noted that as is clear from FIG. 1, the display screen of the display section 35 and the sound output section 36, which are provided in the information processing apparatus 3, are placed at positions close to each other. The display screen of the display section 35 and the actuator 373 are placed at positions close to each other. Further, the sound output section 36 and the actuator 373 are placed at positions close to each other, but are different units disposed at different positions. Consequently, it is possible to include a unit dedicated to outputting a vibration and a unit dedicated to outputting a sound. Thus, it is possible to output a vibration and a sound more accurately than when a general-purpose unit is shared. It should be noted that a module into which a unit for outputting a vibration and a unit for outputting a sound are combined and integrated may be provided in the information processing apparatus 3.

Figure 2:
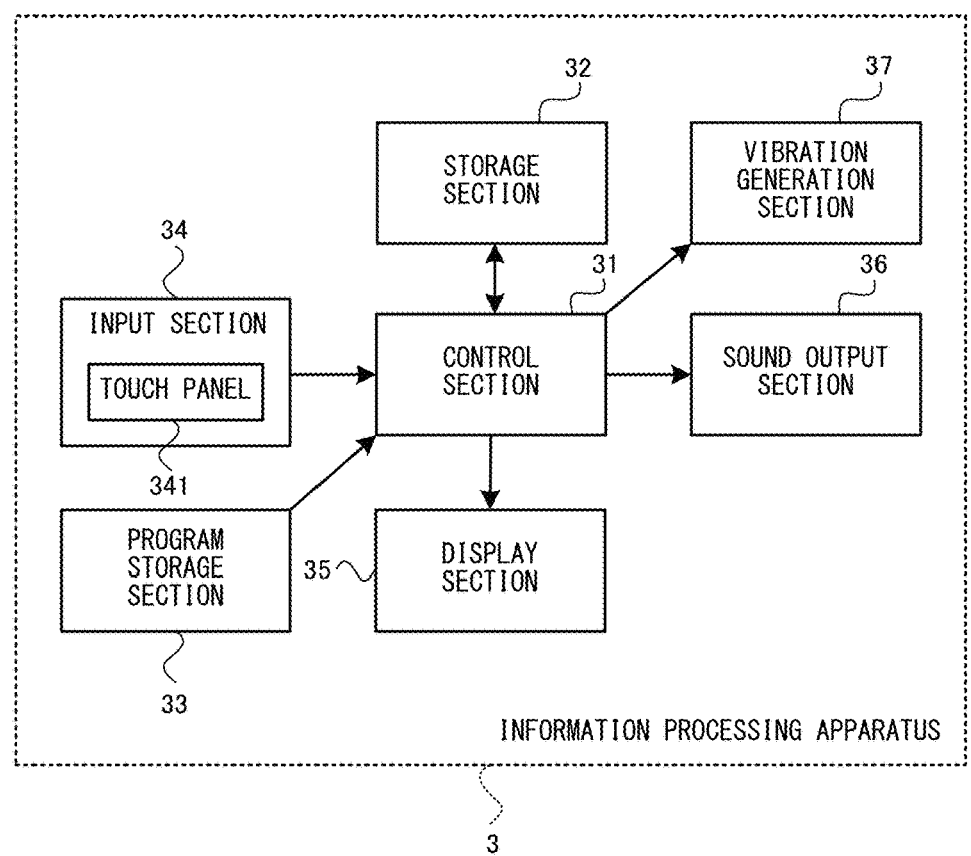
FIG. 2 is a block diagram showing a non-limiting example of the configuration of the information processing apparatus 3.

Next, with reference to FIG. 2, the internal configuration of the information processing apparatus 3 is described. It should be noted that FIG. 2 is a block diagram showing an example of the configuration of the information processing apparatus 3.

In FIG. 2, the information processing apparatus 3 includes the control section 31, a storage section 32, and a program storage section 33 in addition to the input section 34, the display section 35, the sound output section 36, and the vibration generation section 37, which are described above. It should be noted that the information processing apparatus 3 may be composed of one or more apparatuses including: an information processing apparatus having at least the control section 31; and another apparatus.

The control section 31 is information processing means (a computer) for performing various types of information processing and is, for example, a CPU. The control section 31 has the function of performing, as the various types of information processing, processing or the like corresponding to an operation performed on the input section 34 by the user. For example, the functions of the control section 31 are achieved by, for example, the CPU executing a predetermined program.

As the various types of information processing, the control section 31 controls the display of an image to be displayed on the display section 35. Further, as the various types of information processing, the control section 31 outputs, to the sound output section 36, a sound control signal (e.g., a digital sound signal) for controlling a sound to be output from the loudspeaker. Further, as an example of the various types of information processing, the control section 31 generates, based on a sound control signal, a vibration control signal (e.g., a digital vibration signal) for controlling the vibration of the actuator 373 and outputs the vibration control signal to the vibration generation section 37.

The storage section 32 stores various data to be used when the control section 31 performs the above information processing. The storage section 32 is, for example, a memory accessible by the CPU (the control section 31).

The program storage section 33 stores a program. The program storage section 33 may be any storage device (storage medium) accessible by the control section 31. For example, the program storage section 33 may be a storage device provided in the information processing apparatus 3 having the control section 31, or may be a storage medium detachably attached to the information processing apparatus 3 having the control section 31. Alternatively, the program storage section 33 may be a storage device (a server or the like) connected to the control section 31 via a network. The control section 31 (the CPU) may read a part or all of the program to the storage section 32 at appropriate timing and execute the read program.

Next, with reference to FIG. 3, the configuration of the vibration generation section 37 is described. It should be noted that FIG. 3 is a block diagram showing an example of the configuration of the vibration generation section 37.

In FIG. 3, the vibration generation section 37 includes a codec section 371, an amplification section 372, the actuator (vibrator) 373.

The codec section 371 acquires a vibration control signal output from the control section 31 and performs a predetermined decoding process on the vibration control signal, thereby generating an analog vibration signal. Then, the codec section 371 outputs the analog vibration signal to the amplification section 372. For example, to generate a vibration in the actuator 373, the control section 31 outputs a vibration control signal (e.g., a vibration control signal CS) for controlling the vibration to be generated. In this case, the codec section 371 decodes the vibration control signal output from the control section 31, thereby generating an analog vibration signal (e.g., an analog vibration signal AS) for generating a vibration in the actuator 373. Then, the codec section 371 outputs the analog vibration signal to the amplification section 372.

The amplification section 372 amplifies the analog vibration signal output from the codec section 371, thereby generating a driving signal for driving the actuator 373. Then, the amplification section 372 outputs the driving signal to the actuator 373. For example, the amplification section 372 increases changes in the amplitudes of the current and/or the voltage of the analog vibration signal (e.g., the analog vibration signal AS) output from the codec section 371, thereby generating a driving signal (e.g., a driving signal DS). Then, the amplification section 372 outputs the driving signal to the actuator 373.

The actuator 373 is driven in accordance with the driving signal output from the amplification section 372, thereby imparting a vibration corresponding to the driving signal to the main body of the information processing apparatus 3. For example, as shown in FIG. 1, the actuator 373 is provided in the center of the display screen of the display section 35. Here, the method of the actuator 373 imparting a vibration to the main body of the information processing apparatus 3 may be any method. For example, the actuator 373 may use the method of generating a vibration by an eccentric motor (ERM: Eccentric Rotating Mass), the method of generating a vibration by a linear vibrator (LRA: Linear Resonant Actuator), the method of generating a vibration by a piezoelectric element, or the like. If the driving signal to be output from the amplification section 372 is generated in accordance with the method of the actuator 373 generating a vibration, an actuator using any method can impart various vibrations to the user of the information processing apparatus 3.

It should be noted that in the above description, an example has been used where a driving signal for driving the actuator 373 is generated by amplifying the analog vibration signal generated by the codec section 371. Alternatively, the signal output from the codec section 371 to the amplification section 372 may be a digital signal. For example, if the actuator 373 is driven by pulse width modulation (PWM) control, the codec section 371 may generate a pulse signal for turning on and off the actuator 373. In this case, the signal output from the codec section 371 to the amplification section 372 is a digital vibration signal for controlling the driving of the actuator 373 using pulse waves. Consequently, the amplification section 372 amplifies the digital vibration signal.

Figure 5:
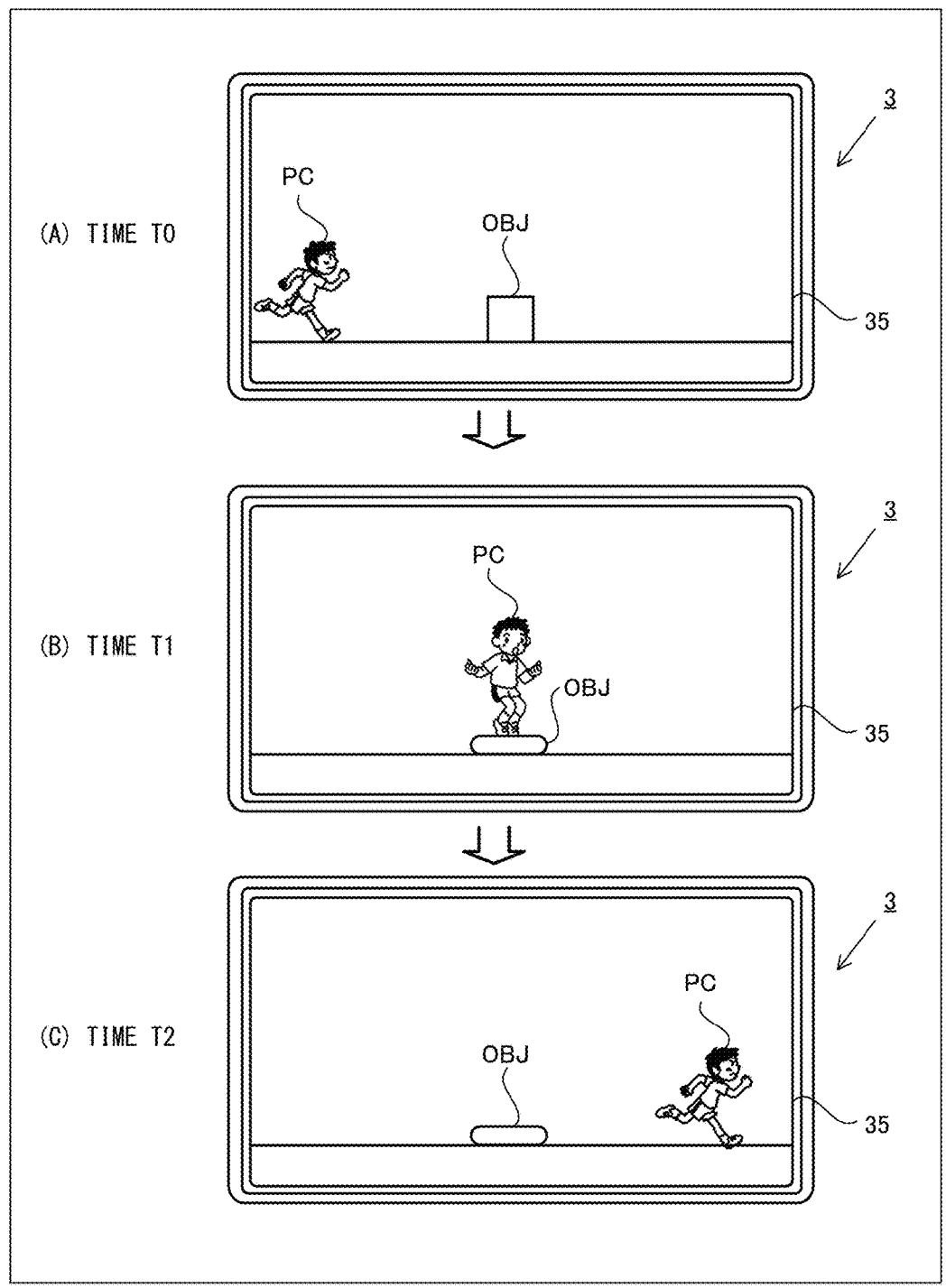
FIG. 5 is diagrams showing non-limiting examples of images of an exemplary game displayed on the display screen of the display section 35.
Figure 6:
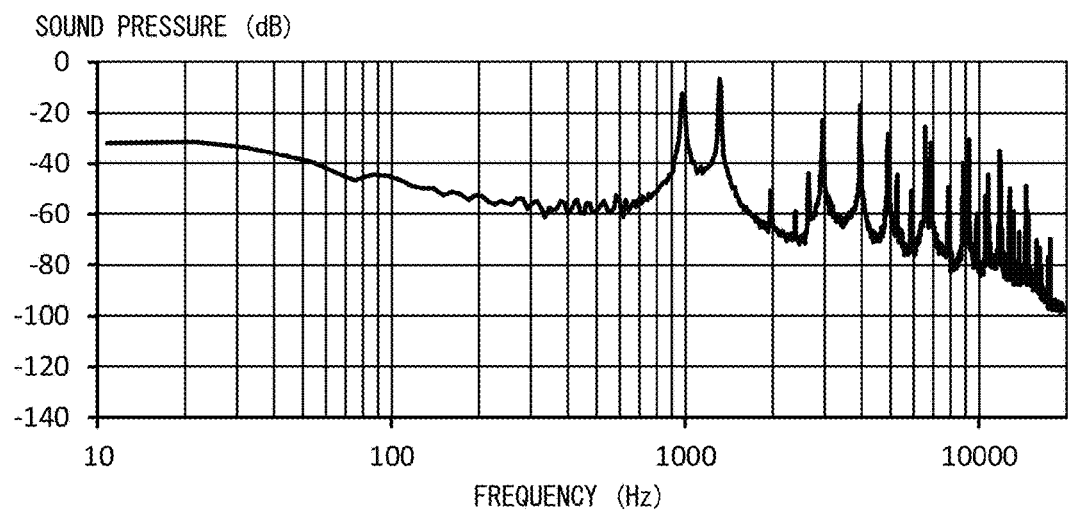
FIG. 6 is a diagram illustrating a non-limiting example of the spectrum of a sound imparted to the main body of the information processing apparatus 3.
Figure 7:
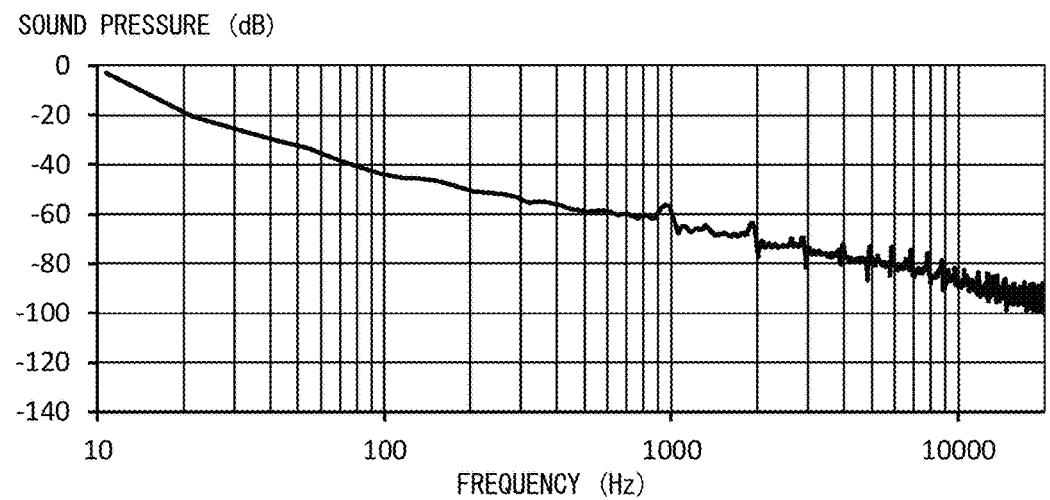
FIG. 7 is a diagram illustrating a non-limiting example of the spectrum of a sound analog signal subjected to a frequency shift process.
Figure 8:
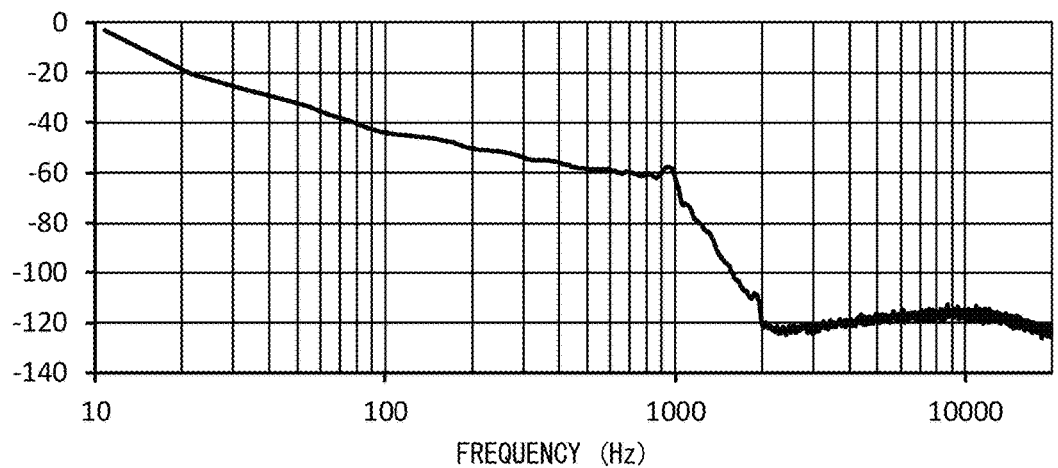
FIG. 8 is a diagram illustrating a non-limiting example of the spectrum of the sound analog signal subjected to a low-pass filter process after being subjected to the frequency shift process.
Figure 9:
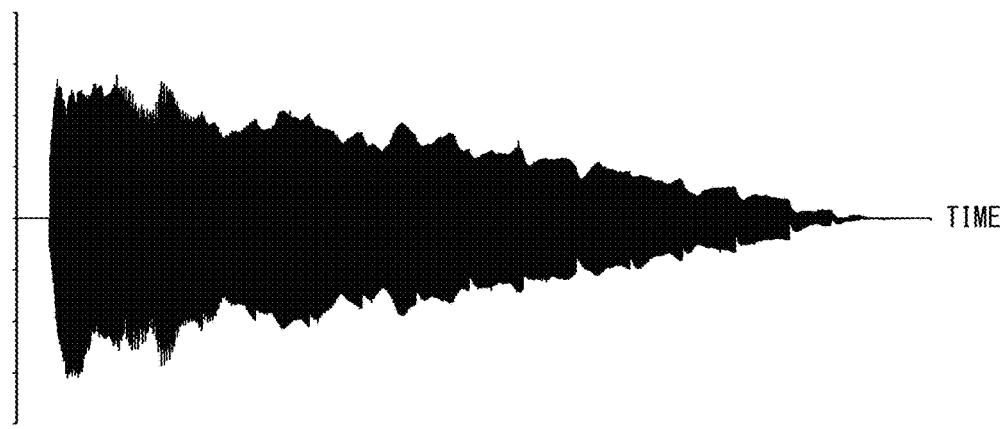
FIG. 9 is a diagram showing a non-limiting example of a sound analog signal used to generate a vibration control signal.
Figure 10:
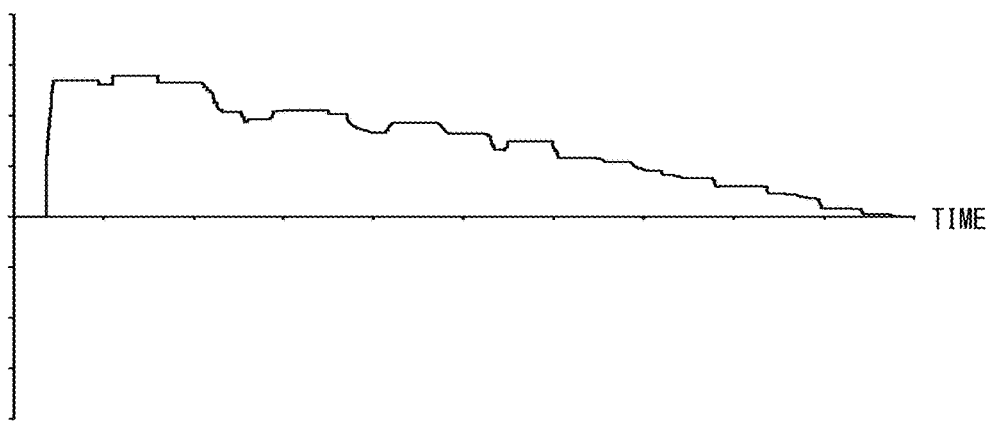
FIG. 10 is a diagram showing a non-limiting example of the sound analog signal subjected to a frequency shift process.
Figure 11:
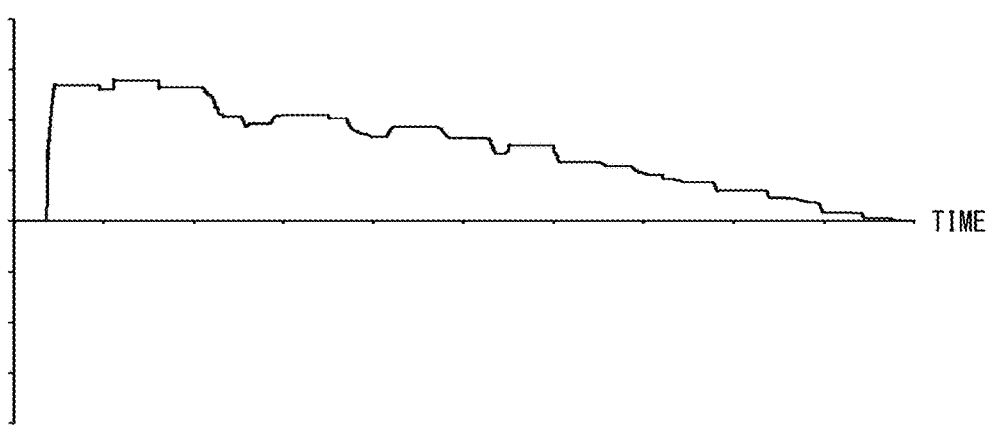
FIG. 11 is a diagram showing a non-limiting example of the analog signal subjected to a low-pass filter process after being subjected to the frequency shift process.
Figure 12:
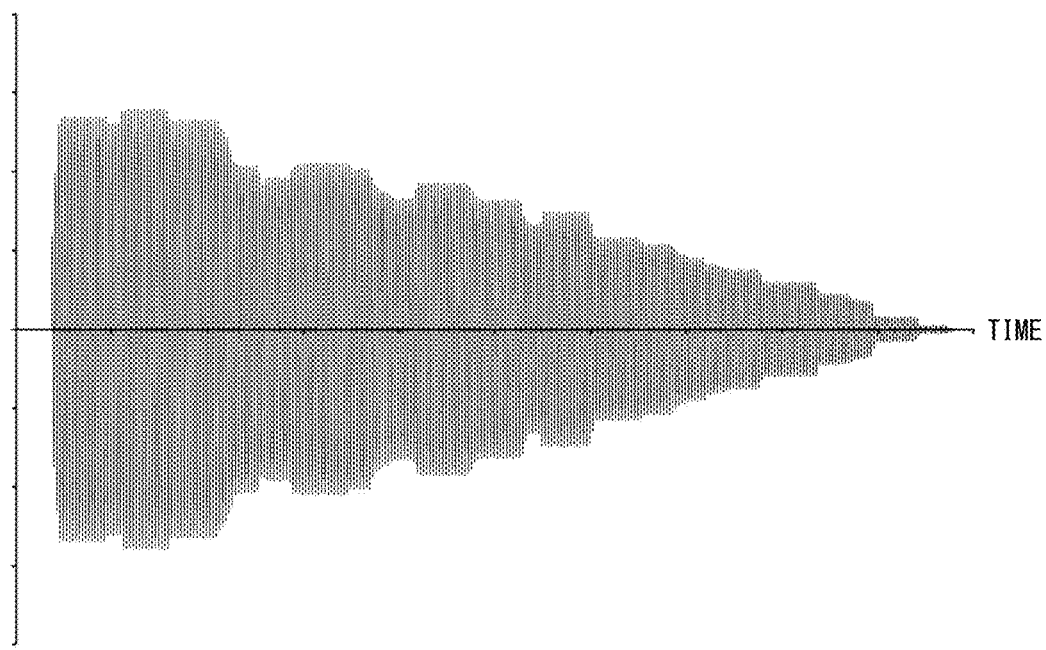
FIG. 12 is a diagram showing a non-limiting example of a vibration analog signal generated using a waveform shown in FIG. 11.

Next, with reference to FIGS. 4 to 12, a description is given of an overview of the processing performed by the information processing apparatus 3, before the description of specific processing performed by the information processing apparatus 3. In the following descriptions, the process of performing a game where a virtual object OBJ or a player character PC moves in the display screen of the display section 35 is used as an example of the information processing performed by the information processing apparatus 3. It should be noted that FIG. 4 is a diagram showing an example where the main body of the information processing apparatus 3 vibrates and simultaneously, a sound is output when a virtual object OBJ displayed on the display screen of the display section 35 moves. FIG. 5 is diagrams showing images of an exemplary game displayed on the display screen of the display section 35. FIG. 6 is a diagram illustrating an example of the spectrum of a sound imparted to the main body of the information processing apparatus 3 in a game. FIG. 7 is a diagram illustrating an example of the spectrum of a sound analog signal for generating the sound when the sound analog signal has been subjected to a frequency shift process. FIG. 8 is a diagram illustrating an example of the spectrum of the sound analog signal subjected to a low-pass filter process after being subjected to the frequency shift process. FIG. 9 is a diagram showing an example of a sound analog signal used to generate a vibration control signal. FIG. 10 is a diagram showing an example of the sound analog signal subjected to a frequency shift process. FIG. 11 is a diagram showing an example of the analog signal subjected to a low-pass filter process after being subjected to the frequency shift process. FIG. 12 is a diagram showing an example of a vibration analog signal generated using a waveform shown in FIG. 11.

In the example shown in FIG. 4, a virtual object OBJ moving in a virtual world is displayed on the display screen of the display section 35. The virtual object OBJ is displayed on the display screen of the display section 35 so as to move in the virtual world in accordance with a user operation or automatically.

In accordance with the movement of the virtual object OBJ, the information processing apparatus 3 outputs a sound, and simultaneously, the main body of the information processing apparatus 3 vibrates. For example, the loudspeaker provided in the main body of the information processing apparatus 3 outputs a sound such that the virtual object OBJ displayed on the display screen of the display section 35 is the sound source. Further, the actuator 373 provided in the main body of the information processing apparatus 3 generates the vibration to occur when the virtual object OBJ moves. In the exemplary embodiment, a vibration signal (a vibration control signal) for vibrating the actuator 373 is generated using a sound signal (a sound control signal) indicating a sound to be output from the information processing apparatus 3.

Next, with reference to FIG. 5, a description is given of an exemplary game, which can be played using the information processing apparatus 3. In the exemplary game described later, in accordance with an operation of the user of the information processing apparatus 3, at least a part of a virtual world including a player character PC, which can move in the virtual world, is displayed on the display screen of the display section 35. For example, the player character PC moves in the virtual world in accordance with an operation of the user using the input section 34 (e.g., the state of a time T0 shown in (A) of FIG. 5).

In the virtual world displayed on the display screen of the display section 35, a virtual object OBJ is placed. If the virtual object OBJ has come into contact with the player character PC in the virtual world (e.g., has been stepped on by the player character PC), then in the progression of the game, the sound of contact (e.g., a crushing sound) is output from the information processing apparatus 3, and simultaneously, the vibration when the virtual object OBJ has come into contact with the player character PC is imparted to the information processing apparatus 3. For example, at a time T1, which is chronologically later than the time the state where the player character PC has come into contact with the virtual object OBJ in the virtual world is displayed on the display screen of the display section 35 (see (B) of FIG. 5). At this time, in the exemplary game, a sound indicating that the virtual object OBJ and the player character PC have come into contact with each other is output from the loudspeaker (the sound output section 36). Further, in the exemplary game, a vibration indicating that the virtual object OBJ and the player character PC have come into contact with each other is imparted by the actuator 373. It should be noted that at a time T2, which is chronologically later than the time T1, the state after the player character PC has come into contact with the virtual object OBJ in the virtual world is displayed on the display screen of the display section 35 (see (C) of FIG. 5).

In addition, as shown in FIG. 6, a sound to be output from the information processing apparatus 3 can have a wideband spectrum. Then, in the exemplary embodiment, it is possible to impart a vibration having a frequency different from the frequency of the sound to the user of the information processing apparatus 3, using sound pressure information of the sound. For example, the information processing apparatus 3 can impart to the user a vibration at 0 to 1000 Hz, which is considered to be able to be felt by a human being, and can also output a sound around a wide band of 20 to 20000 Hz, which are audio frequencies audible to the human ear. The information processing apparatus 3 can control different vibrating bodies (the actuator 373 and the loudspeaker) based on different control signals.

Here, in the exemplary embodiment, a vibration signal (a vibration control signal) is generated using a sound signal (a sound control signal). For example, in the exemplary game, using a sound signal for outputting the sound to be created (e.g., a sound effect representing the virtual object OBJ being crushed) when the virtual object OBJ has come into contact with the player character PC in the virtual world (e.g., has been stepped on by the player character PC), a vibration signal for generating a vibration corresponding to the contact is generated.

As shown in FIGS. 6 and 9, a sound signal (a sound analog signal) from which to generate a vibration signal typically has frequency components in a wide band to output at least a sound in a wide band of 20 to 20000 Hz, which are audio frequencies audible to the human ear. However, the frequency range in which a human being is considered to be able to feel a vibration is 1000 Hz or less. Thus, even if the sound signal is used as it is for a vibration signal, the user cannot feel a vibration corresponding to a sound in the frequency range of 1000 Hz to 20000 Hz. For example, in the case of a sound signal for outputting only a sound in the frequency range of 1000 Hz to 20000 Hz, even if the actuator 373 is vibrated using the sound signal, the user of the information processing apparatus 3 cannot feel the vibration.

In a vibration signal generation process according to the exemplary embodiment, when a vibration corresponding to a sound to be output is generated, a frequency shift process is performed on a sound signal for outputting the sound. For example, in order that the frequency components of a sound signal from which to generate a vibration signal are less than or equal to a predetermined frequency (e.g., 1000 Hz or less, or 20 Hz or less), the maximum value in each certain moving section is extracted from waveform data of the sound signal (e.g., waveform data indicated by a graph where the horizontal axis represents time, and the vertical axis represents sound pressure (amplitude)). Then, using the envelope waveform of the moving maximum values, a frequency shift process is performed on sound pressure information of the sound signal. This makes it possible, in the sound signal, to convert sound pressure information belonging to a high-frequency range into sound pressure information belonging to a frequency range less than or equal to the upper limit at which the user can perceive a vibration (a perception threshold; e.g., 1000 Hz). For example, a waveform shown in FIG. 10 represents a waveform obtained by calculating, in waveform data in which sound pressure information has positive numbers in a sound signal shown in FIG. 9, moving maximum values such that the frequency components of the sound signal are 20 Hz or less, and taking the envelope of the moving maximum values. As shown in FIG. 7, it is understood that in the spectrum of the waveform obtained by taking the envelope of the moving maximum values shown in FIG. 10, sound pressure information belonging to a frequency range above the perception threshold (e.g., 1000 Hz) has been converted into sound pressure information (power information) belonging to a frequency range of 20 Hz or less.

Next, in the vibration signal generation process according to the exemplary embodiment, a low-pass filter process for diminishing components at frequencies higher than a predetermined cutoff frequency (e.g., 1000 Hz or 20 Hz) is performed on the signal obtained by taking the envelope of the moving maximum values. For example, a waveform shown in FIG. 11 represents a waveform obtained by performing on the envelope waveform shown in FIG. 9 a low-pass filter process in which the cutoff frequency is set to 1000 Hz. This low-pass filter process can remove high-frequency components remaining in the envelope waveform. As shown in FIG. 8, it is understood that in the spectrum of the waveform subjected to the low-pass filter process shown in FIG. 11, power information belonging to a frequency range above the cutoff frequency (e.g., 1000 Hz) has been removed.

Next, based on the envelope waveform obtained by removing high-frequency components, a vibration signal for driving the actuator 373 is generated. For example, as shown in FIG. 12, the intensity (amplitude) of a sine wave at a particular frequency is changed into a shape along the shape of the envelope, and a vibration signal for vibrating the actuator 373 is generated using the sine wave after the change. For example, the particular frequency for generating a vibration signal may be set to a frequency less than or equal to the perception threshold (e.g., 1000 Hz), and also to the resonance frequency (e.g., 300 Hz) of an actuator to be vibrated (e.g., the actuator 373) based on the vibration signal. A sine wave at such a particular frequency enables, with excellent energy efficiency, the vibration of a device having a resonance frequency at the particular frequency. This makes it possible to generate a vibration signal taking into account the energy efficiency of the actuator 373.

As another example of generating the vibration signal based on the envelope waveform obtained by removing high-frequency components, to a waveform obtained by changing the intensity (amplitude) of a sine wave at the particular frequency (e.g., the resonance frequency of the actuator) into a shape along the shape of the envelope, a waveform obtained by changing the intensity (amplitude) of a sine wave at another frequency (a frequency less than or equal to the perception threshold (e.g., 1000 Hz) and different from the above particular frequency; e.g., 160 Hz) into a shape along the shape of the envelope may be added. Then, a vibration signal for vibrating the actuator 373 may be generated using the waveform after the addition. This enables the actuator 373 to impart not a vibration having only a single frequency component, but a vibration having a plurality of frequency components, to the main body of the information processing apparatus 3. Further, as will be described later, if a plurality of actuators for imparting vibrations to the user are provided in the information processing apparatus 3 (e.g., a pair of actuators is provided on the left and right of the information processing apparatus 3), the resonance frequencies of the plurality of actuators can be different from each other. Even in such a case, to a waveform obtained by changing the intensity (amplitude) of a sine wave at one resonance frequency into a shape along the shape of the envelope, a waveform obtained by changing the intensity (amplitude) of a sine wave at the other resonance frequency into a shape along the shape of the envelope may be added. Then, a vibration signal for vibrating the actuators may be generated using the waveform after the addition. In this case, it is possible to generate a vibration signal taking into account the energy efficiencies of the respective actuators, using the same vibration signal. Further, the particular frequency and the other frequency may be other than the resonance frequency of an actuator, and may be an energy-efficient frequency of an amplification circuit (the amplification section 372) or the resonance frequency of the casing of the information processing apparatus 3.

As described above, in the above vibration signal generation process, it is possible to easily generate a vibration signal for driving a vibration actuator, using a sound signal for outputting a sound. For example, to generate a vibration signal for imparting "a vibration rich in variety" to the user from scratch, the amount of work will be enormous. A vibration signal, however, is generated from a sound signal, whereby it is possible to easily generate the vibration signal. Further, it is possible to generate the vibration signal based on the sound signal, and therefore, it is possible to use a vibration signal without separately preparing a vibration signal in advance. Further, if a sound signal is used as a vibration signal as it is, a vibration signal that cannot be perceived as a vibration can be generated. In the above vibration signal generation process, however, the frequency of a sound signal in a frequency range where the signal cannot be perceived as a vibration is shifted to a low-frequency range, thereby generating a vibration signal that can be perceived as a vibration. Thus, in the above vibration signal generation process, it is possible to generate a vibration signal enabling the user to perceive a vibration with certainty.

It should be noted that in the above description, a vibration signal for driving the actuator 373 is generated based on the envelope waveform obtained by removing high-frequency components, and the vibration signal is generated by leaving the sound pressure level of the sound signal from which to generate the vibration signal. However, the envelope waveform obtained by raising the sound pressure level of the sound signal from which to generate the vibration signal (e.g., multiplied by a constant greater than 1) may be used, or the envelope waveform obtained by lowering the sound pressure level of the sound signal from which to generate the vibration signal (e.g., multiplied by a constant smaller than 1) may be used.

In addition, in the above description, an example has been used where the moving maximum values of a sound signal are calculated, thereby performing a frequency shift process on the sound signal. Alternatively, the frequencies of the sound signal may be shifted by another method. In the exemplary embodiment, the frequency shift process may be performed by any method so long as it is possible to convert sound pressure information of the sound signal into sound pressure information belonging to a frequency range less than or equal to the perception threshold (e.g., 1000 Hz) by leaving sound pressure information of the sound signal at a predetermined time (e.g., the time when the sound pressure is at a peak).

As a first example, in order that the frequency components of a sound signal from which to generate a vibration signal are less than or equal to a predetermined frequency (e.g., 1000 Hz or less, or 20 Hz or less), the section maximum value in each certain moving section may be extracted from waveform data of the sound signal. Then, using the envelope waveform of the section maximum values, a frequency shift process is performed on sound pressure information of the sound signal.

As a second example, using a curve passing through the local maximum values of the sound pressure in waveform data of a sound signal from which to generate a vibration signal, a frequency shift process may be performed on sound pressure information of the sound signal. It should be noted that in each of the above examples, the frequency shift process may be performed using only positive components of the sound pressure of the sound signal from which to generate the vibration signal. Alternatively, the frequency shift process may be performed using waveform data indicating the absolute values of the sound pressure of the sound signal from which to generate the vibration signal (i.e., waveform data of the reflection, on the positive side, of minus components of the sound pressure of the sound signal).

As a third example, in order that the frequency components of a sound signal from which to generate a vibration signal are less than or equal to a predetermined frequency (e.g., 1000 Hz or less, or 20 Hz or less), the time axis of the sound signal may be expanded at a predetermined rate, part of the sound signal after the expansion may be cut out, and the cut-out parts may be joined together, thereby performing a frequency shift process on sound pressure information of the sound signal. Specifically, if waveform data of the sound signal has been expanded to 20 times in the direction of the time axis, the frequencies of the sound signal are shifted to ½0. Then, the regularity of the frequencies of the sound signal obtained by expanding the frequencies using an autocorrelation function or the like is detected to cut out a waveform. Then, the cut-out waveforms are joined together so as to have the same time length as that before the expansion. This makes it possible to generate a vibration signal subjected to a frequency shift process. In this case, this enables the actuator 373 to impart a vibration having frequency components in a wide band to the main body of the information processing apparatus 3.

It should be noted that if the actuator 373 imparts a vibration having a plurality of frequency components (not a vibration having only a single frequency component) to the main body of the information processing apparatus 3, the actuator 373 may impart a vibration in a frequency range having a predetermined width (a vibration in a wide band) to the main body of the information processing apparatus 3. In this case, a vibration having power in the entire area of the frequency range from a low-frequency component lower than 10 Hz (hertz) to a high-frequency component may be imparted by the actuator 373 to the main body of the information processing apparatus 3. Here, the sensory receptors of a human being for receiving cutaneous sensation include Merkel discs, Meissner corpuscles, Pacinian corpuscles, Ruffini endings, and the like. The Merkel discs are regarded as responding to vibrations at 0 to 200 Hz. The Meissner corpuscles are regarded as responding to vibrations at 20 to 100 Hz and regarded as having the highest sensitivity to vibrations near 30 Hz. The Pacinian corpuscles are regarded as responding to vibrations at 100 to 300 Hz and regarded as having the highest sensitivity to vibrations near 200 Hz. The vibration imparted by the actuator 373 to the main body of the information processing apparatus 3 is generated so as to include a vibration in the frequency range of 0 to 1 kHz, which is regarded as being able to be felt by a human being or include part of a vibration in this frequency range, and also include frequency components to which these sensory receptors can respond. This makes it possible to reproduce a touch rich in reality and present the touch to the user.

In addition, when a vibration signal is generated, to the vibration signal generated by the above vibration signal generation process, the sound signal used as the source of the vibration signal may be further added. In this case, to the vibration signal composed of a signal in a low-frequency range generated by the vibration signal generation process, the sound signal is added that can be included in a signal in a high-frequency range. This enables the generation of a vibration signal richer in variety.

In the exemplary embodiment, vibration data for imparting a vibration to the main body of the information processing apparatus 3 and sound data for outputting a sound from the information processing apparatus 3 may be prepared separately in advance. In this case, with respect to each sound that can be output in conjunction with a vibration, a vibration signal is generated in advance based on a sound signal for outputting the sound and prepared in association with the sound signal. Then, sound data corresponding to a sound to be output from the information processing apparatus 3 and vibration data corresponding to the sound are extracted and read from the prepared sound data and vibration data, thereby generating a vibration control signal and a sound control signal.

In addition, in the exemplary embodiment, in order that when a sound is output, a vibration signal corresponding to the sound to be output is generated, a vibration signal generation process corresponding to the sound output in real time may be performed. In this case, if sound data for outputting a sound from the information processing apparatus 3 is prepared in advance and a vibration is generated in conjunction with the sound to be output, the vibration signal generation process is performed in real time using a sound signal for outputting the sound. Then, the sound is output from the information processing apparatus 3, and a vibration corresponding to the generated vibration signal is imparted by the main body of the information processing apparatus 3 to the user.

In addition, in the above vibration signal generation process, an example has been used where sound pressure information of a sound signal is left and converted into sound pressure information belonging to a frequency range less than or equal to the perception threshold (e.g., 1000 Hz). Alternatively, another form of conversion may be employed. For example, if a frequency shift process for converting sound pressure information belonging to a high-frequency range indicated by a sound signal into sound pressure information belonging to a low-frequency range is performed, frequency components equal to or greater than the perception threshold may be included in at least part of the frequency range of the sound pressure information after the conversion. In this case, as a result of the frequency shift process, a signal in a frequency range where the signal cannot be perceived as a vibration can remain. However, at least part of the sound signal in the frequency range where the signal cannot be perceived as a vibration is changed to a signal in a frequency range where the signal can be perceived as a vibration. Thus, it is possible to expect the effect of a frequency shift to some extent.

Figure 13:
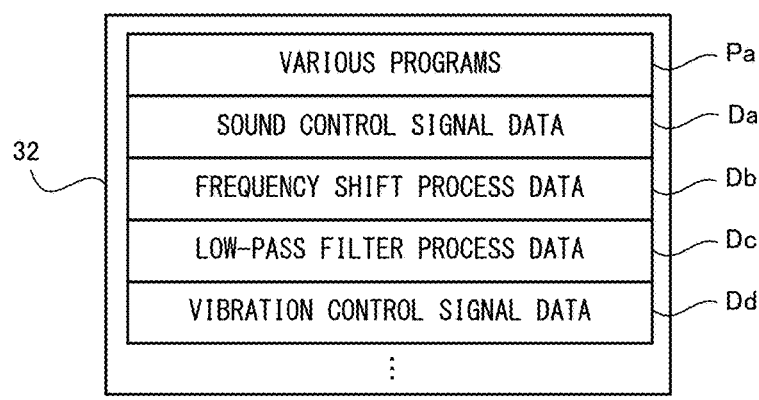
FIG. 13 is a diagram showing non-limiting examples of main data and programs stored in a storage section 32 of the information processing apparatus 3 when a vibration control signal generation process is performed.

Next, a detailed description is given of the processing performed by the information processing apparatus 3. First, with reference to FIG. 13, main data used in the vibration control signal generation process is described. FIG. 13 is a diagram showing examples of main data and programs stored in the storage section 32 of the information processing apparatus 3 when the vibration control signal generation process is performed.

As shown in FIG. 13, the following are stored in the data storage area of the storage section 32: sound control signal data Da; frequency shift process data Db; low-pass filter process data Dc; vibration control signal data Dd; and the like. It should be noted that the storage section 32 may store, as well as the data shown in FIG. 13, data and the like necessary for the processing, such as data used in an application to be executed. Further, in the program storage area of the storage section 32, various programs Pa included in the vibration signal generation program are stored.

The sound control signal data Da is data representing a sound control signal from which to generate a vibration control signal (the vibration control signal CS; see FIG. 3) in the process of generating a vibration control signal. For example, the sound control signal data Da may be data representing a sound control signal to be output from the control section 31 to the sound output section 36, or may be sound data that is not premised on sound output.

The frequency shift process data Db is data obtained by performing a frequency shift process on a sound control signal. The low-pass filter process data Dc is data obtained by performing a low-pass filter process on data subjected to a frequency shift process.

The vibration control signal data Dd is data representing a vibration control signal generated using data subjected to a low-pass filter process. For example, the vibration control signal data Dd may be data representing a vibration control signal (the vibration control signal CS; see FIG. 3) to be output from the control section 31 to the vibration generation section 37.

Figure 14:
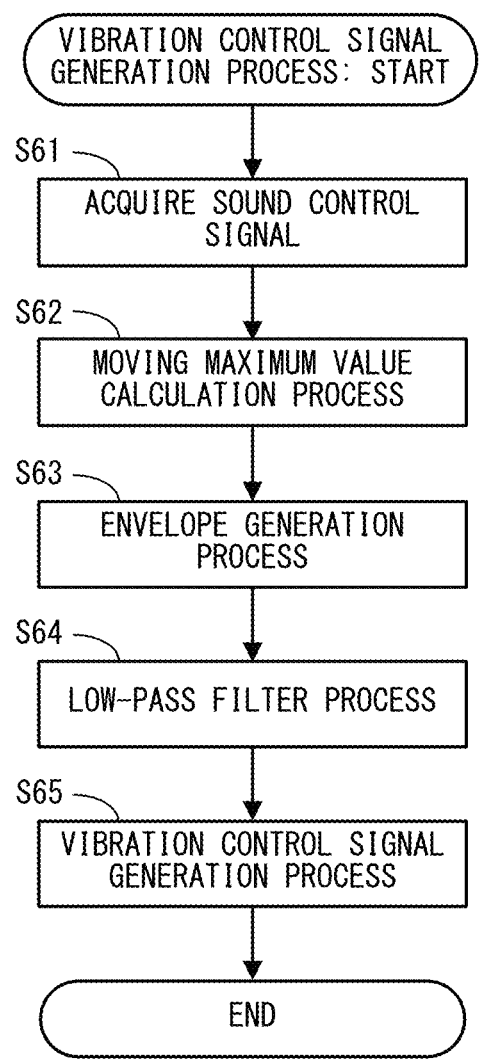
FIG. 14 is a flow chart showing a non-limiting example of the vibration control signal generation process performed by the information processing apparatus 3.

Next, with reference to FIG. 14, a detailed description is given of the vibration control signal generation process, which is an example of the information processing performed by the information processing apparatus 3. It should be noted that FIG. 14 is a flow chart showing an example of the vibration control signal generation process performed by the information processing apparatus 3. Here, in the flow chart shown in FIG. 14, a description is given mainly of, in the processing performed by the information processing apparatus 3, the process of generating a vibration control signal from a sound control signal. The detailed descriptions of other processes not directly related to these processes are omitted. Further, in FIG. 14, all of the steps performed by the control section 31 are abbreviated as "S".

The CPU of the control section 31 initializes a memory and the like of the storage section 32 and loads the vibration signal generation program from the program storage section 33 into the memory. Then, the CPU starts the execution of the vibration signal generation program. The flow chart shown in FIG. 14 is a flow chart showing the processing performed after the above processes are completed.

It should be noted that the processes of all of the steps in the flow chart shown in FIG. 14 are merely illustrative. Thus, the processing order of the steps may be changed, or another process may be performed in addition to and/or instead of the processes of all of the steps, so long as similar results are obtained. Further, in the exemplary embodiment, descriptions are given on the assumption that the control section 31 (the CPU) performs the processes of all of the steps in the flow chart. Alternatively, the CPU may perform the processes of some of the steps in the flow chart, and a processor or a dedicated circuit other than the CPU may perform the processes of the other steps. Yet alternatively, a processor or a dedicated circuit other than the CPU may perform the processes of all of the steps in the flow chart.

Referring to FIG. 14, the control section 31 acquires a sound control signal from which to generate a vibration control signal in the process of generating a vibration control signal (step 61), and the processing proceeds to the next step. For example, the control section 31 selects and acquires a sound control signal to be subjected to the vibration control signal generation process from sound control signals stored in the sound control signal data Da.

Next, the control section 31 performs a moving maximum value calculation process, which is an example of a frequency shift process (step 62), and the processing proceeds to the next step. For example, in order that the frequency components of the sound control signal acquired in the above step 61 are less than or equal to a predetermined frequency (e.g., less than or equal to the perception threshold, namely 1000 Hz or less, or 20 Hz or less), the control section 31 calculates the maximum value in each certain moving section in waveform data indicated by the sound control signal (e.g., waveform data indicated by a graph where the horizontal axis represents time and the vertical axis represents sound pressure).

Next, the control section 31 generates the envelope waveform of the moving maximum values calculated in the above step 62 (step 63), and the processing proceeds to the next step. For example, the control section 31 generates a signal by taking the envelope of the moving maximum values calculated in the above step 62 and stores data representing the generated signal in the frequency shift process data Db.

Next, the control section 31 performs a low-pass filter process for diminishing components at frequencies higher than a predetermined cutoff frequency (e.g., 1000 Hz or 20 Hz), on the signal obtained by taking the envelope of the moving maximum values in the above step 63 (step 64), and the processing proceeds to the next step. For example, the control section 31 performs a low-pass filter process in which the above cutoff frequency is set, on the signal obtained by taking the envelope and stored in the frequency shift process data Db, thereby removing high-frequency components. Then, the control section 31 stores data representing the signal after the process in the low-pass filter process data Dc.

Next, the control section 31 generates a vibration control signal based on the signal indicating the envelope obtained by removing the high-frequency components (step 65), and ends the processing of the flow chart. For example, the control section 31 changes the intensity (amplitude) of a sine wave at a particular frequency into a shape along the shape of the signal stored in the low-pass filter process data Dc, thereby generating, as a vibration control signal, data representing the sine wave after the change. Then, the control section 31 stores the generated data in the vibration control signal data Dd.

Next, with reference to FIG. 15, main data used in the game processing, which is an example of information processing, is described. FIG. 15 is a diagram showing examples of main data and programs stored in the storage section 32 of the information processing apparatus 3 when game processing is performed. It should be noted that the following description of the game processing uses the exemplary game where the virtual object OBJ moves in the virtual world (see FIG. 4).

As shown in FIG. 15, the following are stored in the data storage area of the storage section 32: operation data De; object position data Df; sound setting information data Dg; sound control signal data Dh; vibration control signal data Di; sound data Dj; display image data Dk; and the like. It should be noted that the storage section 32 may store, as well as the data shown in FIG. 15, data and the like necessary for the processing, such as data used in an application to be executed. Further, in the program storage area of the storage section 32, various programs Pb included in a game program are stored. For example, the various programs Pb include a vibration generation program for generating a vibration control signal to impart a vibration to the information processing apparatus 3, a sound generation program for generating a sound control signal to output a sound from the information processing apparatus 3, an image display program for displaying an image on the display section 35, and the like. Further, if a vibration control signal is generated in real time with sound output, the various programs Pb include a vibration control signal generation program for generating a vibration control signal from a sound control signal for outputting the sound.

The operation data De is data representing the content of the operation performed on the input section 34 and includes, for example, data representing the touch position of a touch operation on the touch panel 341. It should be noted that if the input section 34 includes a sensor for detecting the orientation and the motion of the main body of the information processing apparatus 3, the operation data De may include data for calculating the orientation and the motion of the main body of the information processing apparatus 3 (e.g., data representing the acceleration generated in the main body of the information processing apparatus 3 and data representing the angular velocity of the main body of the information processing apparatus 3).

The object position data Df is data representing the position of a virtual object OBJ moving in a virtual world (see FIG. 4).

The sound setting information data Dg includes sound source type data Dgl and the like. The sound source type data Dgl is data representing the type of sound to be output from the information processing apparatus 3.

The sound control signal data Df is data representing a sound control signal to be output from the control section 31 to the sound output section 36. The vibration control signal data Di is data representing a vibration control signal generated based on a sound control signal to be output to the sound output section 36 and is data representing a vibration control signal to be output from the control section 31 to the vibration generation section 37 (the vibration control signal CS; see FIG. 3).

The sound data Dj is data prepared in advance for generating a sound control signal and is stored for each type of sound to be output from the information processing apparatus 3 (e.g., for each virtual object for which a sound is produced or each type of BGM).

The display image data Dk is data for generating an image of each virtual object such as the virtual object OBJ, a background image, and the like and displaying the generated images on the display section 35.

Figure 16:
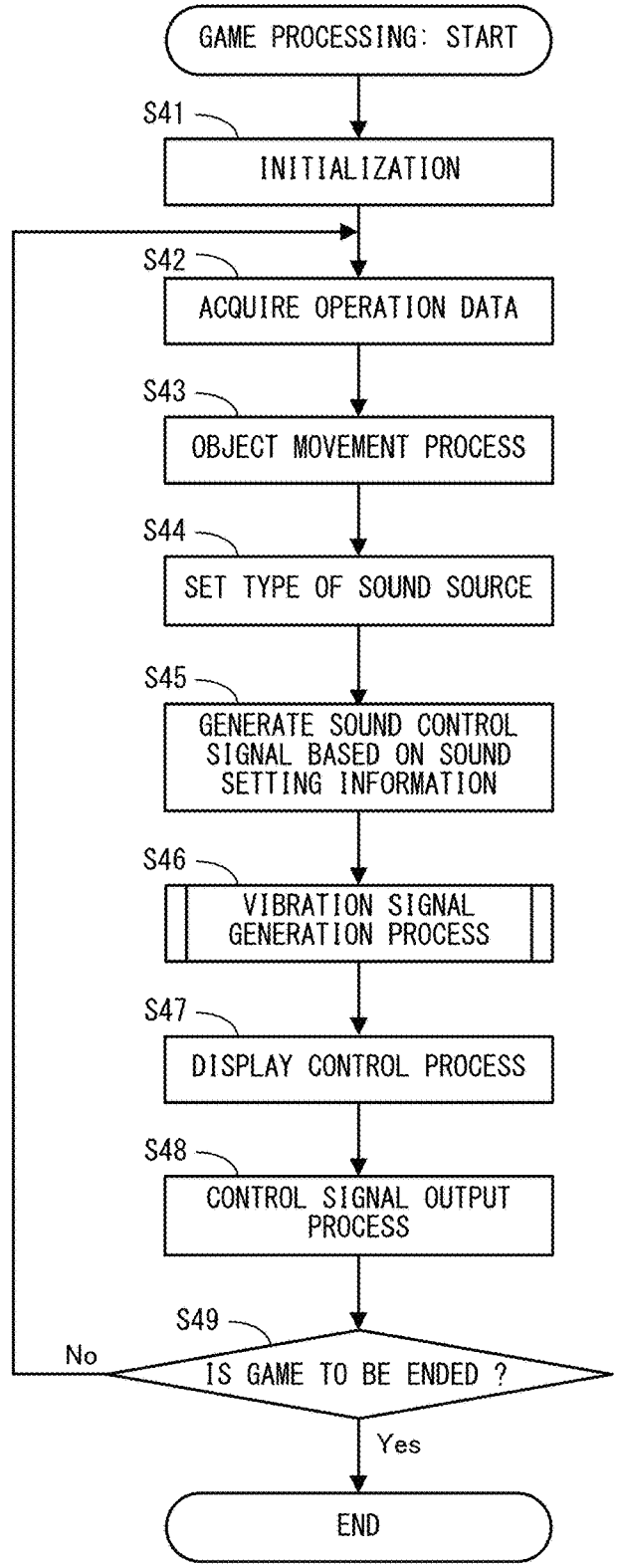
FIG. 16 is a flow chart showing a non-limiting example of game processing performed by the information processing apparatus 3.

Next, with reference to FIG. 16, a detailed description is given of the game processing, which is an example of the information processing performed by the information processing apparatus 3. It should be noted that FIG. 16 is a flow chart showing an example of the game processing performed by the information processing apparatus 3. Here, in the flow chart shown in FIG. 16, a description is given mainly of, in the processing performed by the information processing apparatus 3, the process of outputting a vibration and a sound corresponding to the movement of the virtual object OBJ in the virtual world. The detailed descriptions of other processes not directly related to these processes are omitted. Further, in FIG. 16, all of the steps performed by the control section 31 are abbreviated as "S".

The CPU of the control section 31 initializes a memory and the like of the storage section 32 and loads the game program from the program storage section 33 into the memory. Then, the CPU starts the execution of the game program. The flow chart shown in FIG. 16 is a flow chart showing the processing performed after the above processes are completed.

It should be noted that the processes of all of the steps in the flow chart shown in FIG. 16 are merely illustrative. Thus, the processing order of the steps may be changed, or another process may be performed in addition to and/or instead of the processes of all of the steps, so long as similar results are obtained. Further, in the exemplary embodiment, descriptions are given on the assumption that the control section 31 (the CPU) performs the processes of all of the steps in the flow chart. Alternatively, the CPU may perform the processes of some of the steps in the flow chart, and a processor or a dedicated circuit other than the CPU may perform the processes of the other steps. Yet alternatively, a processor or a dedicated circuit other than the CPU may perform the processes of all of the steps in the flow chart.

Referring to FIG. 16, the control section 31 performs initialization (step 41), and proceeds to the next step. For example, the control section 31 constructs a virtual world to be displayed on the display section 35 and initializes parameters. As an example, the control section 31 places the virtual object OBJ at an initial position in the virtual world and sets the object position data Df. Further, the control section 31 sets the display range to be displayed on the display screen of the display section 35 for the virtual world.

Next, the control section 31 acquires operation data from the input section 34 and updates the operation data De (step 42), and the processing proceeds to the next step.

Next, the control section 31 performs the process of causing the virtual object OBJ to move in the virtual world (step 43), and the processing proceeds to the next step. For example, the control section 31 causes the virtual object OBJ to move at a moving speed determined in advance along a movement path determined in advance in the virtual world and updates the object position data Df using the position of the virtual object OBJ after the movement. As another example, if the control section 31 causes the virtual object OBJ to move in accordance with an operation on the input section 34 (including the operation of moving or tilting the main body of the information processing apparatus 3), the control section 31 causes the virtual object OBJ to move in the virtual world in accordance with the operation data acquired in the above step 42 and updates the object position data Df using the position of the virtual object OBJ after the movement.

Next, the control section 31 sets the type of sound source (step 44), and the processing proceeds to the next step. For example, based on the sound generation program and the type of the virtual object OBJ placed in the virtual world, the control section 31 sets the type of sound when the virtual object OBJ moves. Then, the control section 31 updates the sound source type data Dgl using data representing the type of sound.

Next, based on sound setting information, the control section 31 sets a sound control signal (step 45), and the processing proceeds to the next step. For example, based on the sound generation program and the sound setting information data Dg (the sound source type data Dgl), the control section 31 generates a sound control signal and stores the sound control signal in the sound control signal data Dh. Specifically, the control section 31 reads data from the sound data Dj and generates a sound control signal, so that the sound of the type indicated by the sound source type data Dgl is output from the loudspeaker of the information processing apparatus 3.

Next, the control section 31 performs the vibration control signal generation process using the sound control signal generated in the above step 45 (step 46), and the processing proceeds to the next step. It should be noted that the vibration control signal generation process performed in the above step 46 is similar to the vibration control signal generation process described with reference to FIG. 14, and therefore is not described in detail here. In the above step 46, the control section 31 performs a frequency shift process and a low-pass filter process on the sound control signal generated in the above step 45, thereby generating a vibration control signal (the vibration control signal CS to be output to the vibration generation section 37; see FIG. 3). Then, the control section 31 stores the vibration control signal in the vibration control signal data Di. Consequently, a vibration corresponding to the sound control signal is imparted to the main body of the information processing apparatus 3. It should be noted that if a vibration control signal corresponding to a sound control signal for outputting a sound has been generated in advance, then in the above step 46, the control section 31 performs the process of extracting a vibration control signal corresponding to the sound control signal from the vibration control signal generated in advance.

Next, the control section 31 performs a display control process (step 47), and the processing proceeds to the next step. For example, based on an image generation program and the object position data Df, the control section 31 performs the process of generating an image of the virtual world in which the virtual object OBJ is placed, and displaying on the display section 35 the image of the virtual world in the set display range.

Next, the control section 31 performs a control signal output process (step 48), and the processing proceeds to the next step. For example, the control section 31 outputs to the vibration generation section 37 the vibration control signal CS indicated by the vibration control signal data Di. Consequently, the vibration generation section 37 generates a vibration corresponding to the vibration control signal CS from the actuator 373. Further, the control section 31 outputs to the sound output section 36 the sound control signal indicated by the sound control signal data Dh. Consequently, the sound output section 36 outputs a sound corresponding to the sound control signal from the loudspeaker.

Next, the control section 31 determines whether or not the game processing is to be ended (step 49). Examples of conditions for ending the game processing include: the satisfaction of the condition under which the game processing is ended; and the fact that the user has performed the operation of ending the game processing. If the game processing is not to be ended, the control section 31 returns to the above step 42 and repeats the process thereof. If the game processing is to be ended, the control section 31 ends the processing indicated by the flow chart.

As described above, in the processing according to the above exemplary embodiment, it is possible to easily generate a vibration control signal for driving the actuator 373, using a sound control signal for outputting a sound. Further, it is possible to perform processing using a vibration control signal without separately preparing the vibration control signal in advance. Further, in the above vibration control signal generation process, the frequencies of a sound control signal in a frequency range where the signal cannot be perceived as a vibration are shifted to a low-frequency range, thereby generating a vibration control signal that can be perceived as a vibration. Thus, it is possible to generate a vibration control signal enabling the user to perceive a vibration with certainty.

It should be noted that in the above exemplary embodiment, an example has been used where a single actuator 373 is provided in the information processing apparatus 3. Alternatively, a plurality of actuators for imparting vibrations to the user may be provided. As an example, a pair of actuators may be provided on the left and right of the information processing apparatus 3. In this case, the control section 31 may generate vibration control signals for driving the respective actuators from a single sound signal, or may generate vibration control signals for driving the respective actuators from different sound signals (e.g., a left sound signal for outputting a sound from a left loudspeaker and a right sound signal for outputting a sound from a right loudspeaker).

For example, if a plurality of actuators 373 are provided and independent vibrations are generated from the respective actuators 373, the control section 31 outputs a vibration control signal for controlling the vibration of each actuator 373. In this case, the codec section 371 decodes the vibration control signals output from the control section 31, thereby generating analog vibration signals for generating vibrations in the respective actuators 373. Then, the codec section 371 outputs the vibration control signals to the amplification section 372. Then, the amplification section 372 increases changes in the amplitudes of the current and/or the voltage of each of the analog vibration signals output from the codec section 371, thereby generating driving signals. Then, the amplification section 372 outputs the driving signals to the plurality of actuators 373. If a plurality of actuators are included in the information processing apparatus 3, with the use of phantom sensation that stimulates two different points in the user's skin (as an example, the left hand and the right hand of the user holding the main body of the information processing apparatus 3) to cause the user to perceive a pseudo stimulus at one point, the actuators can also impart, to the user of the information processing apparatus 3, vibrations for causing the user to perceive the position of a predetermined image displayed on the display section 35, as the vibration source in a pseudo manner.

In addition, the above descriptions are given using the example where the information processing apparatus 3 performs information processing (the vibration control signal generation process and the game processing). Alternatively, another apparatus may perform at least some of the processing steps in the information processing. For example, if the information processing apparatus 3 is further configured to communicate with another apparatus (e.g., another server, another game apparatus, or another mobile terminal), the other apparatus may cooperate to perform the processing steps of the information processing. As an example, another apparatus may perform at least one of the virtual world image generation process, the vibration control signal generation process, and the sound control signal generation process, and the information processing apparatus 3 may acquire image data and control signals indicating the result of the process. Another apparatus may thus perform at least some of the processing steps in the information processing, thereby enabling processing similar to the above information processing. Further, the above information processing can be performed by a processor or the cooperation of a plurality of processors, the processor or the plurality of processors included in an information processing system including at least one information processing apparatus. It should be noted that the information processing system including at least one information processing apparatus can be an information processing system including a plurality of information processing apparatuses (a so-called system including a complex of a plurality of apparatuses), or can be an information processing system including a single information processing apparatus (a so-called system including a single apparatus including a plurality of units). Further, in the above exemplary embodiment, the processing indicated in the above flow chart is performed by the control section 31 of the information processing apparatus 3 executing a predetermined vibration signal generation program. Alternatively, a part or all of the information processing indicated in the flow chart may be performed by a dedicated circuit included in the information processing apparatus 3.

Here, the above variations make it possible to achieve the exemplary embodiment also by a system form such as so-called cloud computing, or a system form such as a distributed wide area network or a local area network. For example, in a system form such as a distributed local area network, it is possible to execute the information processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the process of each step of the above information processing. Thus, it goes without saying that it is possible to achieve the exemplary embodiment by sharing the processing in any manner.

In addition, the processing orders, the setting values, the conditions used in the determinations, and the like that are used in the above information processing are merely illustrative. Thus, it goes without saying that the exemplary embodiment can be achieved also with other orders, other values, and other conditions. Further, the shapes, the number, the placement positions, the functions, and the like of the components used by the above information processing apparatus are merely illustrative, and may be other shapes, number, and placement positions. It goes without saying that the exemplary embodiment can be achieved by the information processing apparatus having other functions. As an example, three or more actuators may impart vibrations to the information processing apparatus, or three or more loudspeakers may output sounds from the information processing apparatus. Alternatively, the information processing apparatus may include a plurality of display sections. Further, in the above description, a mobile apparatus (e.g., a tablet terminal) has been used as an example of the information processing apparatus 3. Alternatively, the information processing apparatus 3 may be a handheld apparatus or a portable apparatus larger than a mobile apparatus. Here, a handheld apparatus is an apparatus that can be operated by the user holding it in their hands, and is a concept including the above mobile apparatus. Further, a portable apparatus is an apparatus that allows the movement of the main body of the apparatus when the apparatus is used, or allows a change in the orientation of the main body of the apparatus when the apparatus is used, or allows the carrying around of the main body of the apparatus, and is a concept including the above handheld apparatus and mobile apparatus.

In addition, the vibration signal generation program may be supplied to the information processing apparatus 3 not only through an external storage medium such as the external memory 45, but also through a wired or wireless communication link. Further, the vibration signal generation program may be stored in advance in a non-volatile storage device included in the information processing apparatus 3. It should be noted that examples of an information storage medium having stored therein the vibration signal generation program may include CD-ROMs, DVDs, optical disk storage media similar to these, flexible disks, hard disks, magneto-optical disks, and magnetic tapes, as well as non-volatile memories. Alternatively, an information storage medium having stored therein the vibration signal generation program may be a volatile memory for storing the vibration signal generation program. It can be said that such a storage medium is a storage medium readable by a computer or the like. For example, it is possible to provide the above various functions by causing a computer or the like to load a game program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, a vibration generation system, a vibration generation apparatus, a vibration signal generation program, a vibration generation method, and the like in order, for example, to easily generate a vibration signal for outputting a vibration rich in variety.

What is claimed is:

1. A vibration signal generation system for generating a vibration signal from a sound signal, the vibration signal generation system comprising one or more processors configured to:
   in a frequency shift, convert sound pressure information indicated by a sound signal and belonging to a frequency range above an upper limit which enables at least a user to perceive a vibration and at which human cutaneous sensation is received, into sound pressure information belonging to a frequency range less than or equal to the upper limit; and
   generate a vibration signal using the sound pressure information after the conversion in the frequency shift,
   wherein in the frequency shift, a moving maximum value in each certain moving section is extracted from waveform data of the sound signal, and using the moving maximum value, the sound pressure information belonging to the frequency range above the upper limit is converted into the sound pressure information belonging to the frequency range less than or equal to the upper limit.

2. The vibration signal generation system according to claim 1, wherein in the frequency shift, sound pressure at a time is used and converted into the sound pressure information belonging to the frequency range less than or equal to the upper limit.

3. The vibration signal generation system according to claim 1, wherein in the frequency shift, a section maximum value in each certain section is extracted from waveform data of the sound signal, and using the section maximum value, the sound pressure information belonging to the frequency range above the upper limit is converted into the sound pressure information belonging to the frequency range less than or equal to the upper limit.

4. The vibration signal generation system according to claim 1, wherein in the frequency shift, a curve passing through a local maximum value of sound pressure in waveform data of the sound signal is used and converted into the sound pressure information belonging to the frequency range less than or equal to the upper limit.

5. The vibration signal generation system according to claim 1, wherein in the frequency shift, a time axis of the sound signal is expanded, part of the sound signal after the expansion is cut out, and the cut-out parts are joined together, thereby converting the sound pressure information belonging to the frequency range above the upper limit into the sound pressure information belonging to the frequency range less than or equal to the upper limit.

6. The vibration signal generation system according to claim 1, further comprising a low-pass filter configured to, in the sound pressure information after the conversion in the frequency shift, diminish a component at a frequency higher than a cutoff frequency set to be less than or equal to a frequency corresponding to the upper limit,
wherein in the generation of the vibration signal, the vibration signal is generated using the sound pressure information obtained by diminishing the component at the frequency higher than the cutoff frequency.

7. The vibration signal generation system according to claim 1, wherein in the generation of the vibration signal, the vibration signal is generated by changing an intensity of a sine wave at a particular frequency, using the sound pressure information after the conversion in the frequency shift.

8. The vibration signal generation system according to claim 1, further comprising at least one vibrator, wherein the one or more processors is further configured to, as vibration control, vibrate the vibrator using the vibration signal generated in the generation of the vibration signal.

9. The vibration signal generation system according to claim 8, further comprising at least one sound output unit, wherein:
the one or more processors is further configured to, as sound control, control a sound to be output from the sound output unit, and
a vibration to be output from the vibrator is controlled in the vibration control and a sound to be output from the sound output unit is controlled in the sound control, so that the vibration to be output from the vibrator and the sound to be output from the sound output unit are related to each other.

10. The vibration signal generation system according to claim 1, wherein in the frequency shift, based on a peak of sound pressure indicated by the sound signal, the sound pressure information belonging to the frequency range above the upper limit is converted into the sound pressure information belonging to the frequency range less than or equal to the upper limit.

11. The vibration signal generation system according to claim 1, wherein in the frequency shift, based on all peaks of sound pressure indicated by the sound signal, the sound pressure information belonging to the frequency range above the upper limit is converted into the sound pressure information belonging to the frequency range less than or equal to the upper limit.

12. A vibration signal generation system for generating a vibration signal from a sound signal, the vibration signal generation system comprising one or more processors configured to:
in a frequency shift, convert sound pressure information indicated by a sound signal and belonging to a frequency range above an upper limit that enables at least a user to perceive a vibration, into sound pressure information belonging to a frequency range less than or equal to the upper limit; and
generate a vibration signal using the sound pressure information after the conversion in the frequency shift;
wherein in the frequency shift, the sound pressure information belonging to the frequency range above the upper limit is converted into sound pressure information belonging to a frequency range where a sound cannot be listened to by the user, and
wherein in the generation of the vibration signal, the sound signal before the conversion in the frequency shift is added to the sound pressure information after the conversion in the frequency shift, thereby generating the vibration signal.

13. A vibration signal generation apparatus for generating a vibration signal from a sound signal, the vibration signal generation apparatus comprising one or more processors configured to:
in a frequency shift, convert sound pressure information indicated by a sound signal and belonging to a frequency range above an upper limit which enables at least a user to perceive a vibration and at which human cutaneous sensation is received, into sound pressure information belonging to a frequency range less than or equal to the upper limit; and
generate a vibration signal using the sound pressure information after the conversion in the frequency shift,
wherein in the frequency shift, a moving maximum value in each certain moving section is extracted from waveform data of the sound signal, and using the moving maximum value, the sound pressure information belonging to the frequency range above the upper limit is converted into the sound pressure information belonging to the frequency range less than or equal to the upper limit.

14. The vibration signal generation apparatus according to claim 13, wherein in the frequency shift, based on a peak of sound pressure indicated by the sound signal, the sound pressure information belonging to the frequency range above the upper limit is converted into the sound pressure information belonging to the frequency range less than or equal to the upper limit.

15. A non-transitory computer-readable storage medium having stored therein a vibration signal generation program executed by a computer included in a vibration signal generation apparatus for generating a vibration signal from a sound signal, the vibration signal generation program causing the computer to execute:
in a frequency shift, converting sound pressure information indicated by a sound signal and belonging to a frequency range above an upper limit which enables at least a user to perceive a vibration and at which human cutaneous sensation is received, into sound pressure information belonging to a frequency range less than or equal to the upper limit; and
generating a vibration signal using the sound pressure information after the conversion in the frequency shift,
wherein in the frequency shift, a moving maximum value in each certain moving section is extracted from waveform data of the sound signal, and using the moving maximum value, the sound pressure information belonging to the frequency range above the upper limit is converted into the sound pressure information belonging to the frequency range less than or equal to the upper limit.

16. The non-transitory computer-readable storage medium according to claim 15, wherein in the frequency shift, based on a peak of sound pressure indicated by the sound signal, the sound pressure information belonging to the frequency range above the upper limit is converted into the sound pressure information belonging to the frequency range less than or equal to the upper limit.

17. A vibration signal generation method for generating a vibration signal from a sound signal, the vibration signal generation method comprising:

in a frequency shift, converting sound pressure information indicated by a sound signal and belonging to a frequency range above an upper limit which enables at least a user to perceive a vibration and at which human cutaneous sensation is received, into sound pressure information belonging to a frequency range less than or equal to the upper limit; and generating a vibration signal using the sound pressure information after the conversion in the frequency shift, wherein in the frequency shift, a moving maximum value in each certain moving section is extracted from waveform data of the sound signal, and using the moving maximum value, the sound pressure information belonging to the frequency range above the upper limit is converted into the sound pressure information belonging to the frequency range less than or equal to the upper limit.

18. The vibration signal generation method according to claim 17, wherein in the frequency shift, based on a peak of sound pressure indicated by the sound signal, the sound pressure information belonging to the frequency range above the upper limit is converted into the sound pressure information belonging to the frequency range less than or equal to the upper limit.

* * * * *